United States Patent
De Piero et al.

(10) Patent No.: US 9,669,352 B2
(45) Date of Patent: Jun. 6, 2017

(54) AIR COMPRESSOR

(71) Applicant: Ingersoll-Rand Company, Davidson, NC (US)

(72) Inventors: Paolo De Piero, Tavagnacco (IT); Stefano Vezil, Trieste (IT); Charles John Bergh, Berwyn, PA (US)

(73) Assignee: Ingersoll-Rand Company, Davidson, NC (US)

( * ) Notice: Subject to any disclaimer, the term of this patent is extended or adjusted under 35 U.S.C. 154(b) by 451 days.

(21) Appl. No.: 14/133,323

(22) Filed: Dec. 18, 2013

(65) Prior Publication Data

US 2014/0165633 A1    Jun. 19, 2014

Related U.S. Application Data

(60) Provisional application No. 61/738,570, filed on Dec. 18, 2012.

(51) Int. Cl.
*F25D 17/06* (2006.01)
*B01D 53/26* (2006.01)
*F24F 3/14* (2006.01)

(52) U.S. Cl.
CPC .......... *B01D 53/265* (2013.01); *F24F 3/1405* (2013.01)

(58) Field of Classification Search
CPC ................. B01D 53/265; Y02E 60/142; F28D 2021/038; F28D 9/0093; F28D 7/0008
See application file for complete search history.

(56) References Cited

U.S. PATENT DOCUMENTS 5,983,651 A    11/1999   Huang
6,085,529 A    7/2000    Galus et al.
(Continued)

FOREIGN PATENT DOCUMENTS

| EP | 1593924 A2 | 9/2005 |
|---|---|---|
| EP | 1240936 B1 | 2/2008 |
| WO | 2012135864 A1 | 10/2012 |

OTHER PUBLICATIONS

International Search Report and Written Opinion, PCT US 2013/076240, Apr. 30, 2014.
(Continued)

*Primary Examiner* — Elizabeth Martin
(74) *Attorney, Agent, or Firm* — Taft Stettinius & Hollister LLP (57) ABSTRACT

An air compressor system is disclosed that includes a housing sized to enclose an air compressor pump as well as a dryer structured to remove moisture from air that is compressed by the compressor pump. The air compressor pump may be intermittently placed into operation, but the dryer itself is structured in one form to continuously maintain a heat exchanger in a desired temperature range in anticipation of operation of the air compressor pump. The heat exchanger of the dryer can include sufficient thermal mass such that a refrigerant pump of the dryer need not be operated continuously in anticipation of operation of the air compressor pump. While a cooling air flow can be created by operation of the air compressor pump, when the air compressor pump is not operated a cooling fan can be used provide cooling to the heat generating components of the dryer.

29 Claims, 8 Drawing Sheets

(56) References Cited

U.S. PATENT DOCUMENTS

| | | | |
|---|---|---|---|
| 6,332,327 B1* | 12/2001 | Street | F25B 49/02 |
| | | | 236/51 |
| 2006/0080981 A1 | 4/2006 | King et al. | |
| 2008/0110183 A1* | 5/2008 | Collins | B01D 53/265 |
| | | | 62/56 |
| 2008/0223052 A1 | 9/2008 | Khosla et al. | |
| 2011/0061409 A2 | 3/2011 | Dering et al. | |
| 2013/0000341 A1* | 1/2013 | De Piero | F28D 9/0062 |
| | | | 62/228.1 |

OTHER PUBLICATIONS

Wikipedia encyclopedia document titled Rotary Screw Compressor, http://en.wikipedia.org/wiki/Rotary_screw_compressor (6 pages).

* cited by examiner

AIR COMPRESSOR

CROSS REFERENCE TO RELATED APPLICATIONS

The present application claims the benefit of U.S. Provisional Patent Application 61/738,570 filed Dec. 18, 2012, the contents of which are incorporated herein by reference in their entirety.

TECHNICAL FIELD

The present invention generally relates to air dryers for use with air compressors.

BACKGROUND

The present disclosure relates to air compressor systems and arrangements for removing moisture and other contaminates from compressed air. Compressor systems are often used to provide compressed air for powering machinery, hand, tools, and the like. Air compressors typically compress atmospheric air, which contains moisture. As a result, conventional air compressors generate what is referred to as wet compressed air, wherein the term "wet" refers to the fact that there is typically undesirable amounts of liquid water, water vapor, and other contaminants in the compressed air. Because moisture can cause damage or corrosion in machines and tools, the compressed air supplied to a point of use should be substantially dry. Accordingly, air dryers are generally provided upstream from a point of use in compressed air systems and serve to remove moisture and other contaminates from the compressed air. A refrigerated air dryer operates to remove moisture from the air by cooling the air to cause the moisture vapor in the air to condense, extracting the condensed moisture, and then reheating the air.

Some existing air dryer and air compressor systems have various shortcomings relative to certain applications. Accordingly, there remains a need for further contributions in this area of technology.

SUMMARY

One embodiment of the present invention is a unique air compressor system that includes a dryer and cooling fan. Other embodiments include apparatuses, systems, devices, hardware, methods, and combinations for maintaining temperature of a dryer heat exchanger within a range while providing sufficient cooling for operation of a refrigerant compressor. Further embodiments, forms, features, aspects, benefits, and advantages of the present application shall become apparent from the description and figures provided herewith.

BRIEF DESCRIPTION OF THE FIGURES

Features of the invention will he better understood from the following detailed description when considered-in reference to the accompanying drawings, in which.

DETAILED DESCRIPTION

The present application discloses various embodiments of an integrated air dryer for compressed air and methods for using and constructing the same. For the purposes of promoting an understanding of the principles of the invention, reference will now be made to the embodiments illustrated in the drawings, and specific language will be used to describe the same. It will nevertheless be understood that no limitation of the scope of the invention is thereby intended. Any alterations and further modifications in the described embodiments, and any further applications of the principles of the invention as described herein, are contemplated as would normally occur to one skilled in the art to which the invention relates having the benefit of the present disclosure.

Figure 1:
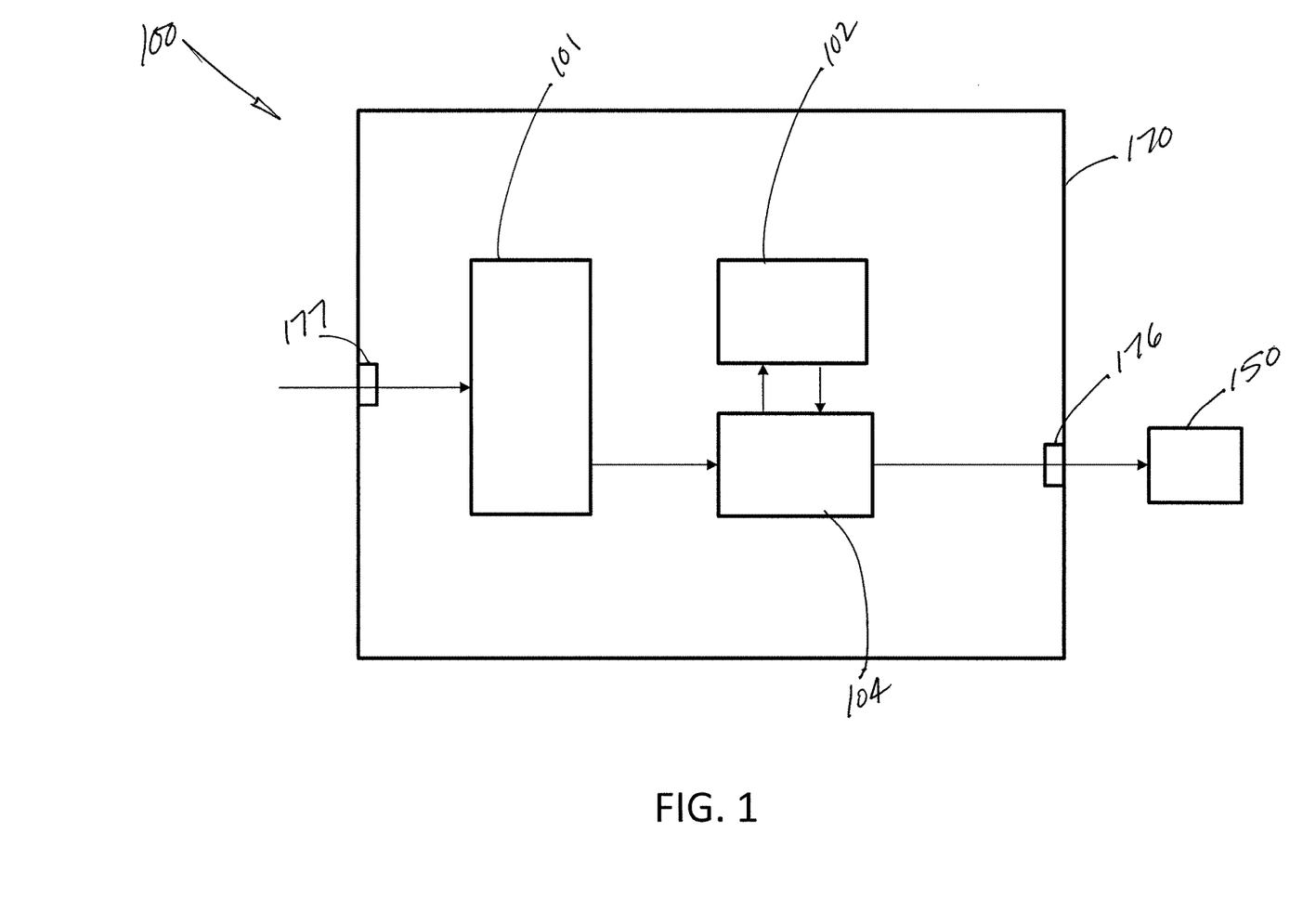
FIG. 1 shows a schematic of an embodiment of an integrated air dryer according to the present disclosure.

As shown in FIG. 1, an integrated air dryer system 100 may include an air compressor subassembly 101 integrated into a single, fully enclosed assembly with an air dryer 104 and a refrigeration circuit 102. The integrated air dryer system 100 enables a reliable, convenient, portable, and adaptable source of dry compressed air to be available at any point of use 150 in a wide range of operating conditions. The integrated air dryer system 100 may be enclosed in a housing 170 having vent portions 177 formed therethrough that enable a flow of ambient air into and out of the system 100. The housing 170 may include openings 176 to enable fluid connection between the air dryer 104 within the housing 170 and a point of use 150 outside the housing 170. Accordingly, ambient air may be drawn into the air compressor subassembly 101 via a vent portion 177, pushed through the air dryer 104, where the compressed air exchanges heat with the refrigeration circuit 102, and then pushed out of the air dryer 104 to a point of use 150 via an opening 176. The housing 170 may have additional openings. By way of non-limiting example, such openings may enable connection to a supply of electrical power, access to control or circuit panels, and access for maintenance of the system 100. Further, the housing 170 may allow additional air flows through the openings to those specifically described herein.

Figure 2:
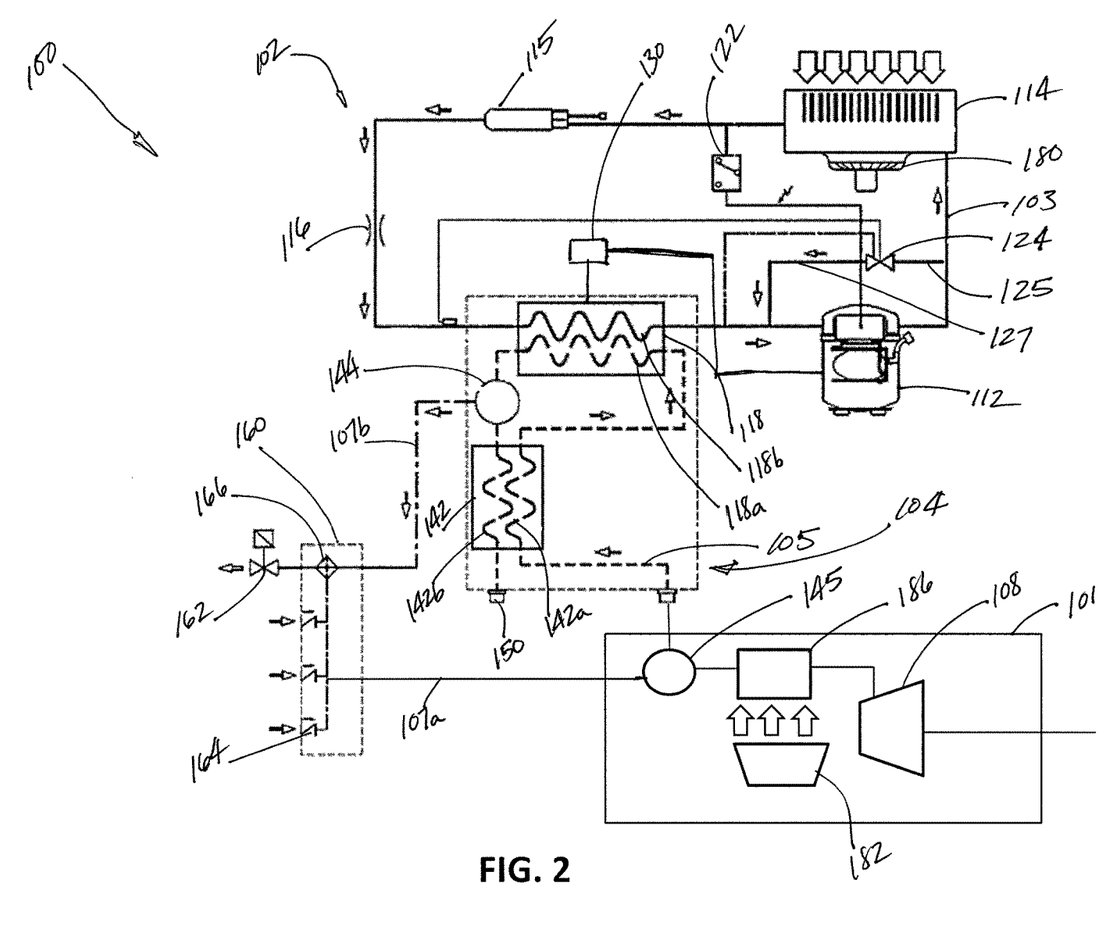
FIG. 2 shows a schematic of an embodiment of an integrated air dryer according to the present disclosure.

FIG. 2 shows a schematic of an integrated air dryer system 100 according to at least one embodiment according to the present disclosure. As shown in FIG. 2, the integrated air dryer system 100 may include the refrigeration circuit 102 in thermal communication with the air dryer 104. The air dryer 104 may include precooling heat exchanger 142, an air chiller heat exchanger 118 (hereinafter referred to as the "chiller 118"), and a second condensate separator 144 fluidly connected in series by a dryer air line 105 to the point of use 150. The air dryer 104 removes water vapor from the wet compressed air supplied by the air compressor subassembly 101, such that the integrated air dryer system 100 provides dry compressed air to a point of use 150. The point of use 150 may be a reservoir in which dry compressed air may be stored for later use. The air dryer 104 may include other components for monitoring and regulating the air flow as understood in the art. The integrated air dryer system 100 may further include the air compressor subassembly 101 in fluid connection with the air dryer 104.

As shown in FIG. 2, the air compressor subassembly 101 may include an air compressor 108 fluidly connected to an air cooler 186, which is further fluidly connected to a first condensate separator 145. The first condensate separator 145 may be fluidly connected to the air dryer 104 to enable a flow of compressed air to be dried. The air compressor 108 includes a drive motor. The air compressor 108 may be a single compressor or a plurality of compressors arranged in parallel and/or series to generate a flow of compressed air at a desired flow rate and pressure. The air cooler 186 may be an air-to-air heat exchanger or radiator. The first condensate separator 145 removes liquid water that coalesces as the compressed air from the air compressor 108 passes through the air cooler 186. Without the first condensate separator 145, liquid water may enter the air dryer 104, which may reduce the efficiency of the heat exchange process in the chiller 118. The first condensate separator 145 may be further connected to a drain line 107a, which is in fluid communication with a condensate drain 160. The drain line 107a removes the collected liquid water and other contaminates from the air compressor subassembly 101.

The air compressor subassembly 101 may further include a cooling fan 182 adjacent the air cooler 186. The cooling fan 182 may provide a cooling flow of air across the air cooler 186 to cool the compressed air exiting the air compressor 108 and thereby facilitate condensation of water vapor out of the compressed air flow prior to the first condensate separator 145 and subsequently the air dryer 104. The cooling fan 182 may be configured to operate only when the air compressor 108 is operating and generating a flow of compressed air through the air cooler 186. The cooling flow generated by the cooling fan 182 may be directed across a condenser 114 of the refrigeration circuit 102 as described further herein to provide cooling flow for the refrigeration circuit 102. The cooling flow generated by the cooling fan 182 may further provide cooling for the motor of the air compressor 108.

The refrigeration circuit 102 may include a refrigerant loop 103 containing a fluid, such as a refrigerant, fluidly coupling a refrigerant compressor 112, the condenser 114, an expander 116, and the chiller 118. The refrigerant compressor 112, condenser 114, and expander 116 may be similar to components of a conventional vapor-compression refrigeration system. The chiller 118 acts as an evaporator in the refrigeration cycle formed by the refrigeration cycle 102, transferring thermal energy as heat from the air dryer 104 into the refrigeration circuit 102 when the air compressor subassembly 101 is operating. The transferred heat is expelled from the refrigeration circuit 102 in the condenser 114 as part of the refrigeration cycle. When the air compressor subassembly 101 is not operating (e.g., due to low demand for compressed air), no compressed air flows through the chiller 118 and, therefore, little or no heat is transferred from the air dryer 104 to the refrigeration circuit 102. Additional heat, referred to herein as "internal heat," may be generated within the refrigeration circuit 102 itself, for instance by operation of the refrigerant compressor 112, and transferred to the fluid flowing within the refrigerant loop 103. This internal heat may also be expelled from the refrigeration circuit 102 in the condenser 114 as part of the refrigeration cycle.

To improve heat transfer from the condenser 114, air flow may be generated over the condenser 114. As noted, the cooling fan 182 of the air compressor subassembly 101 may provide such flow when the air compressor 108 is operating. However, the refrigeration circuit 102 may be operated independent of the air compressor subassembly 101. Consequently, a cooling flow may be advantageous to dissipate the internal heat generated by the operation of the refrigeration circuit 102 itself. The refrigeration circuit 102 may include a condenser fan 180 disposed external to the refrigerant loop 103, which draws ambient air across the condenser 114, thereby dissipating heat from the refrigerant flowing therethrough.

Figure 3:
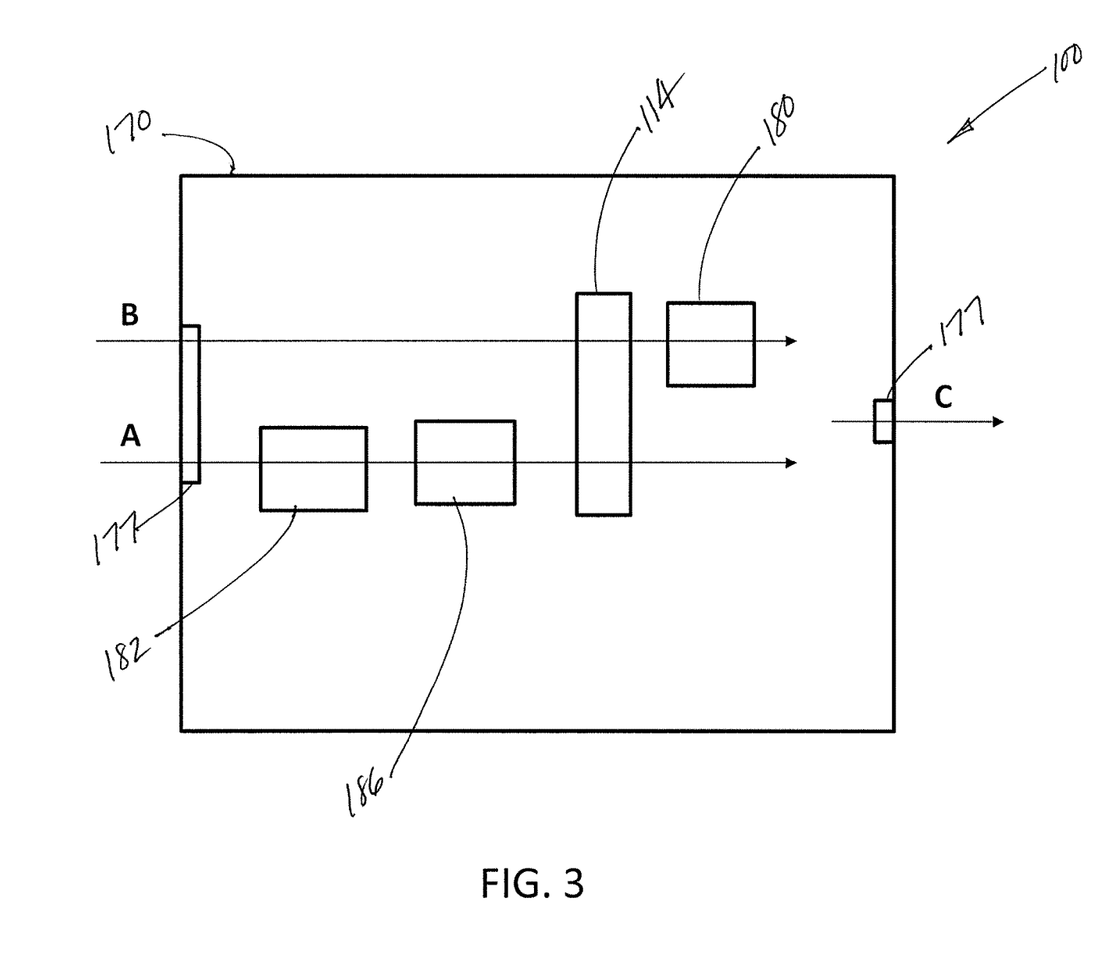
FIG. 3 shows a schematic of air flow paths through an embodiment of an integrated air dryer according to the present disclosure.

As shown in one embodiment illustrated in FIG. 3, the integrated air dryer 100 may thus include three air flow paths, a first flow path A, a second flow path B, and a third flow path C. The first flow path A may flow into the system 100 from the environment, drawn by the cooling fan 182, across the air cooler 186, and across the condenser 114. The second flow path B may flow into the system 100 from the environment, drawn by the condenser fan 180, and across the condenser 114. The third flow path C may flow from within the system 100 to environment, such that the third flow path C may be comprised of air flow from the first flow path A and/or the second flow path B. As will be understood by one skilled in the art having the benefit of the present disclosure, the condenser fan 180 and the cooling fan 182 may be configured to either push or draw air flows. Consequently, the position of the condenser fan 180 and the cooling fan 182 relative to the condenser 114 and the air cooler 186 (and other components of the system 100), whether upstream or downstream, may be different than as depicted in FIG. 3. All such configurations are within the scope of the disclosure. For example, in alternative embodiments, the condenser fan 180 may direct the second flow path B directly across the refrigerant compressor 112 without first flowing across the condenser 114, thereby providing a separate cooling effect directly to the refrigerant compressor 112. Accordingly, the cooling effect resulting from the second flow path B may include convective heat transfer from the refrigerant compressor 212.

In at least one embodiment of the present disclosure, the first flow path A will only be generated when the air compressor subassembly 101, including the air compressor 108, is operating. Similarly, the second flow path B will only be generated when the air compressor subassembly 101, including the air compressor 108, is not operating, but the refrigeration circuit 102, including the refrigerant compressor 112, is operating. The third flow path C may be generated under either condition. By using the first flow path A to provide cooling to both the air cooler 186 and the refrigeration circuit 102, via the condenser 114, the heat transfer processes within the integrated air dryer system 100 may be improved while consuming less power.

In at least one embodiment, a flow capacity of the condenser fan 180 may be selected such that the resulting cooling effect across the condenser 114 is large enough to dissipate heat generated in the refrigerant compressor 112 under conditions when the air compressor subassembly 101 is not operating and no compressed air flows through the air dryer 104. Conversely, the flow capacity of the condenser fan 180 need not be so large as to provide the cooling required to adequately dissipate heat transferred to the refrigeration circuit 102 from the air dryer 104 when the air compressor 108 is operating because this degree of cooling may be generated solely by the cooling fan 182 of the air compressor subassembly 101. Consequently, the condenser fan 180 may have relatively low flow capacity, power consumption, and cost compared to the cooling and/or condenser fans of conventional integrated air dryers. Thus, the condenser fan 180 may mitigate the risk of the refrigerant compressor 112 overheating while consuming less electrical power and being less costly than a conventional air dryer cooling fans.

In operation when the air compressor subassembly 101 is operating, the air compressor subassembly 101 introduces relatively wet compressed air at a first temperature $T_A$ into the dryer air line 105 of the air dryer 104. The wet compressed air passes through precooling heat exchanger 142 via a precooling path 142a, expels heat to a reheating path 142b within the precooling heat exchanger 142, and is cooled to a second temperature $T_B$ lower than the first temperature $T_A$, at which point some water may begin to condense from vapor to liquid. The wet compressed air then flows through the chiller 118 via an air path 118a, expels heat to a refrigerant path 118b, which is a portion of the refrigeration cycle 102, and is cooled to a third temperature $T_C$ below the second temperature $T_B$ such that water further condenses from vapor to liquid. The wet compressed air then flows through the second condensate separator 144 where the condensed liquid water is separated to yield dry compressed air. The dry compressed air then flows through the reheating path 142b of the precooling heat exchanger 142, where heat is exchanged with the incoming wet compressed air in the precooling path 142a and is heated to a fourth temperature $T_D$ higher than the third temperature $T_C$. Raising the temperature of the dry compressed air to the fourth temperature $T_D$ inhibits the formation of condensation on the outside of downstream plumbing. Downstream of the precooling heat exchanger 142, the dry compressed air at the fourth temperature D is available at the point of use 150.

The second condensate separator 144 may include a drain line 107b, which is in fluid communication with the condensate drain 160, including one or more one-way valves 164 and a strainer 166. The second condensate separator 144 may separate liquid water from the compressed air by vortex action. Alternatively, the second condensate separator 144 may use coalescing action or another method to remove liquid from the compressed air, such as by having the air flow through a demister pad. The drain line 107 removes the collected liquid water and other contaminates from the system 100. Other condensate separators are known and may be used, as desired.

In a conventional air dryer, when the air compressor is not active and no compressed air is flowing through the evaporator, the refrigerant in the refrigeration cycle may become exceedingly cold due to the lack of heat transfer from the air dryer. Under conditions when the air compressor is not operating and no compressed air flows through the evaporator, continued operation of the refrigeration cycle may result in refrigerant temperatures below the freezing point of water and the formation of ice within the evaporator, which may damage the system, causing blockages, rupture of the evaporator, and/or inefficient heat transfer. Ice may form particularly when a conventional integrated air dryer system is operated at low ambient temperatures, making evaporator operation below the freezing point more likely. Though the formation of ice in the system may be mitigated by cycling the refrigerant compressor on and off based on demands for compressed air, and subsequent operation of the air compressor, frequent cycling without cooling air flow can cause excessive over-heating and potentially premature failure of refrigerant compressor. Unlike such conventional air dryers, the integrated air dryer system 100 prevents operation below the freezing point, and thereby the formation of ice, and further reduces the need to cycle the refrigerant compressor 112 frequently, thereby preventing over-heating.

According to at least one embodiment of the present disclosure, the chiller 118 includes greater thermal capacitance than a conventional chiller/evaporator. The chiller 118 includes two thermal capacitances (in some embodiments, the chiller 118 may include more or fewer thermal capacitances), a wall thermal capacitance and a storage thermal capacitance. The wall thermal capacitance includes the thermal capacitance inherent in the mass of the chiller 118, including the walls defining the air path 118a, the refrigerant path 118b, and the surrounding structure needed to give the chiller 118 structural integrity. The storage thermal capacitance of the chiller 118 includes additional mass selected to provide a predetermined thermal capacity. The predetermined thermal capacity may be determine from the design and operational parameters of the system 100. Such parameters may include the anticipated flow rates through the refrigeration circuit 102 and the air dryer 104, the wall thermal capacitance of the chiller 118 sized to enable sufficient heat transfer at the given flow rates, the anticipated ambient conditions in which the system will operate, the anticipated duty cycle of the air circuit, and the desired duty cycle of the refrigerant compressor. Accordingly, the storage thermal capacitance of the chiller 118 may be engineered to provide sufficient cooling of the wet compressed air flowing through the chiller 118 for a predetermine period of time under conditions when the refrigerant compressor 112 is not operating.

Figure 4:
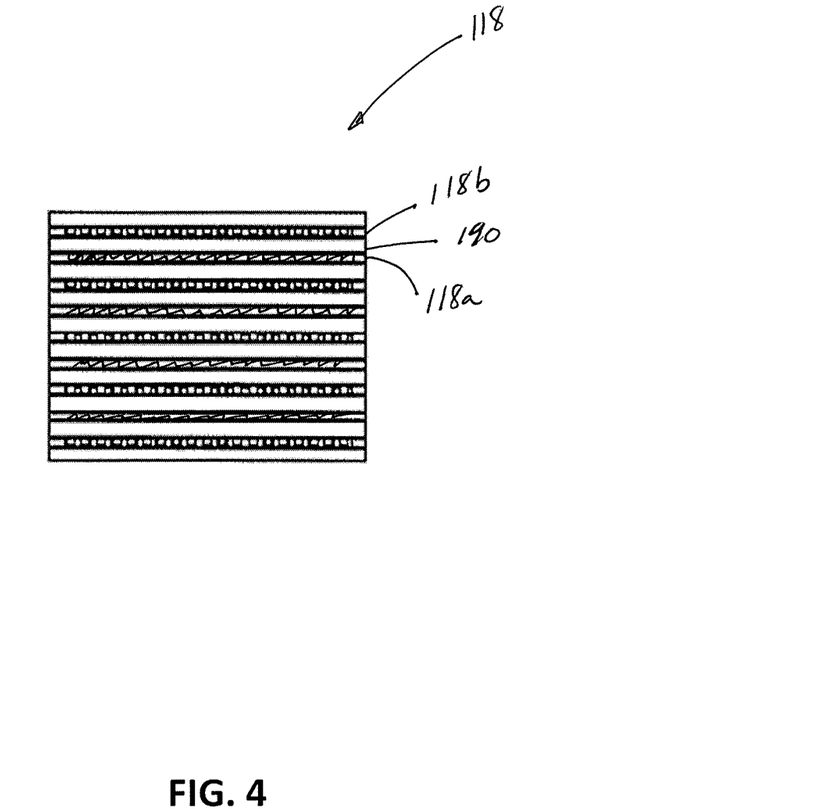
FIG. 4 shows an end view of an embodiment of a heat exchanger for an integrated air dryer according to the present disclosure.

In at least one embodiment, the chiller 118 may include one of more plates 190 disposed adjacent the air path 118a and the refrigerant path 118b, as shown in FIG. 4. The plates 190 may be selected to provide a predetermined storage thermal capacitance that enables the refrigerant compressor 112 to operate less frequently, whereby the storage thermal capacitance may enable cooling for a predetermined period of time. The plates 190 may be a material with a high thermal capacitance, including but not limited to a ceramic or a metal, such as aluminum. Alternatively, the walls defining the air path 118a and the refrigerant path 118b within the chiller 118 may be thicker than conventional heat exchangers, thereby increasing the thermal capacitance of the chiller 118. The walls defining the fluid flow paths of a conventional heat exchanger may have a thickness sufficient to give the heat exchanger adequate structural integrity, where such a wall thickness provides a conventional wall thermal capacitance. In contrast, the walls defining the air path 118a and the refrigerant path 118b within the chiller 118 may be thicker than required for the structural integrity of the chiller, such that the additional wall thickness beyond that needed for structural integrity (i.e., the conventional wall thermal capacitance) defines an additional predetermined storage thermal capacitance. Consequently, the increased storage thermal capacitance of the chiller 118 enables the refrigeration circuit 102 to cool the compressed air flowing through the air dryer 104 without frequently cycling the refrigerant compressor 112.

For example, in operation the refrigerant compressor 112 may be activated and the refrigeration circuit 102 may operate until the temperature of the chiller 118 reaches a low temperature limit $T_L$. Upon reaching the low temperature limit $T_L$, the refrigerant compressor 112 may be switched off, but the chiller 118 continues to cool the compressed air in the air dryer 104 as heat is transferred to the relatively cool storage thermal capacitance of the chiller 118. With the refrigerant compressor 112 switched off, the temperature of the chiller 118 gradually rises until it reaches a high temperature limit $T_H$. Moreover, if the air compressor 108 is switched off and compressed air is not flowing through the chiller 118, the temperature of the chiller 118 may rise more gradually, thereby further delaying the need to cycle on the refrigerant compressor 112. Once the chiller 118 reaches the high temperature limit $T_H$, the refrigerant compressor 112 is switched on and operates until the temperature of the chiller 118 reaches the low temperature limit $T_L$ again.

In at least one embodiment, the low temperature limit $T_L$ may be about 2° C., and the high temperature limit $T_H$ may be about 5° C. Accordingly, the temperature of the chiller 118 does not reach the freezing point, and ice formation may be prevented. Alternatively, the low and high temperature limits $T_L$, $T_H$ may be selected in concert with the predetermined storage thermal capacitance of the chiller 118 to ensure that the refrigerant compressor 112 is not cycled on and off too frequently, which can lead to overheating and potentially failure of the refrigerant compressor 112. For example, excessive temperatures in the refrigerant compressor motor windings may cause electrical failures as insulation within the compressor brings to breakdown or mechanical failures as lubricants begin to breakdown at elevated temperature. To protect against overheating, a predetermined safety limit may be set for the temperature of the refrigerant compressor 112, such that the safety limit is less than a failure temperature for the refrigerant compressor 112. Accordingly, the low and high temperature limits $T_L$, $T_H$ and the predetermined storage thermal capacitance of the chiller 118 may be selected to ensure the refrigerant compressor 112 operates below the safety limit. In at least one alternative embodiment, the low and high temperature limits $T_L$, $T_H$ and the storage thermal capacitance of the chiller 118 may be selected to ensure that the refrigerant compressor 112 cycles no more frequently than once every 6 minutes or 10 cycles per hour. Consequently, the refrigerant compressor 112 and the refrigeration circuit 102 may operate independently of the air dryer 104, and the duty cycle of the refrigerant compressor 112 may be reduced accordingly.

As shown in FIG. 2, the integrated air dryer system 100 may include a controller 130 capable of operating upon a change in temperature, the controller 130 in communication with the chiller 118. In some embodiments the controller 130 can be an analog device that senses temperature and provides a switching function, such as switching an electrical device on and off. In at least one embodiment, the controller 130 may be a thermostatic switch. In at least one embodiment, the thermostatic switch may respond to changes in temperature with a hysteresis response. In such an embodiment, the thermostatic switch may include hysteresis about a center point temperature to enable the low and high temperature limits $T_L$, $T_H$. In certain embodiments, the system 100 may include a temperature sensor (not shown) in thermal communication with the chiller 118 and in communication with a controller 130. The controller 130 may monitor the output of the temperature sensor and activate or deactivate the refrigerant compressor 112 according to the low and high temperature limits $T_L$, $T_H$ as described herein. The controller 130 may comprise digital circuitry, analog circuitry, or a hybrid combination of both of these types. Also, the controller 130 can be programmable, an integrated state machine, or a hybrid combination thereof. The controller 130 can include one or more Arithmetic Logic Units (ALUs), Central Processing Units (CPUs), memories, limiters, conditioners, filters, format converters, or the like which are not shown to preserve clarity. In one form, the controller 130 is of a programmable variety that executes algorithms and processes data in accordance with operating logic that is defined by programming instructions (such as software or firmware). Alternatively or additionally, operating logic for the controller 130 can be at least partially defined by hardwired logic or other hardware. It should be appreciated that controller 130 can be exclusively dedicated to monitor the temperature of the chiller 118 or may further be used in the regulation/control/activation of one or more other subsystems or aspects of the integrated air dryer system 100.

The temperature sensor may be any suitable type of sensor that enables communication with the controller 130 and control of the refrigerant compressor 112, including but not limited to a thermocouple, a resistive temperature device (RTD), a thermistor, an infrared radiator, a bimetallic device, a liquid expansion device, a molecular change-of-state device, and a silicon diode. In at least one embodiment, the functions of the temperature sensor and controller 130 may be performed by a thermostatic switch.

Figure 5:
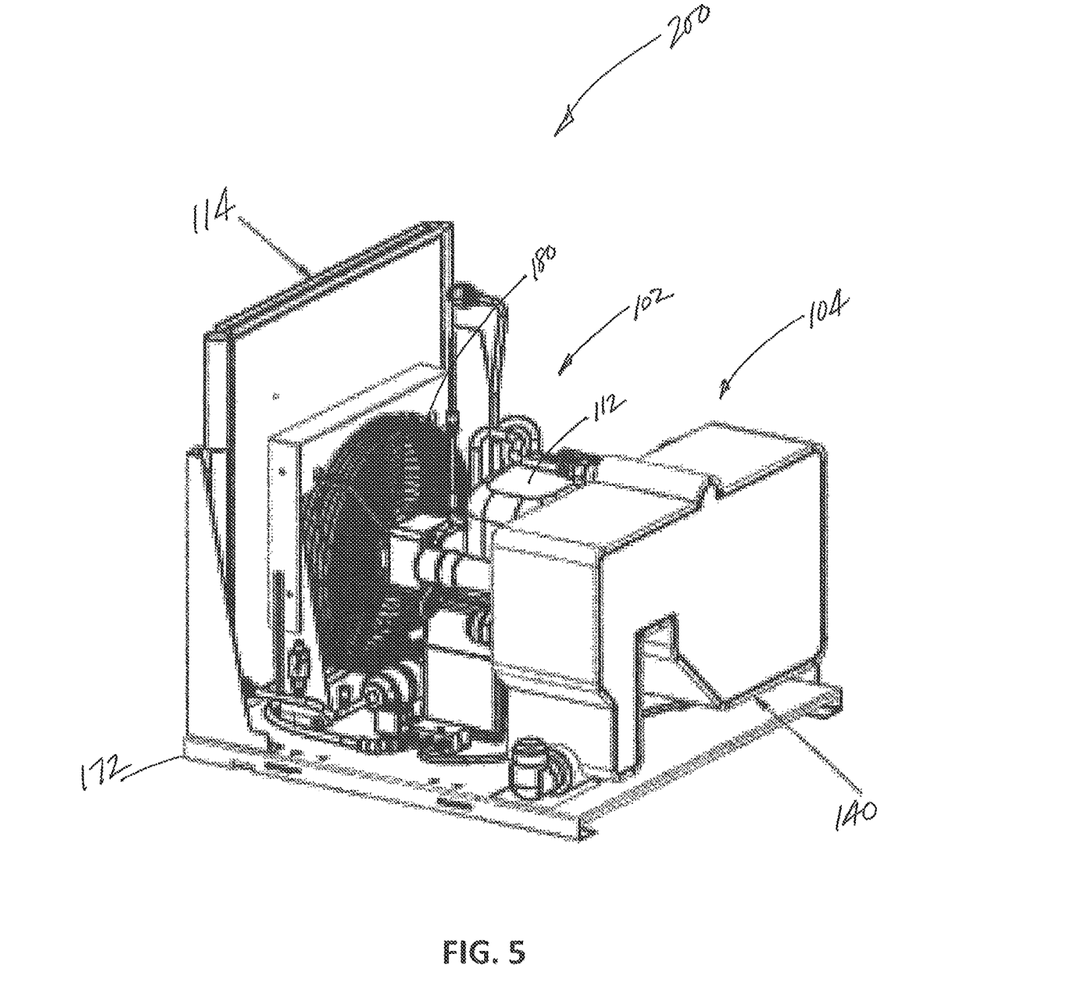
FIG. 5 shows a perspective view of an embodiment of subassembly of an integrated air dryer according to the present disclosure.
Figure 6:
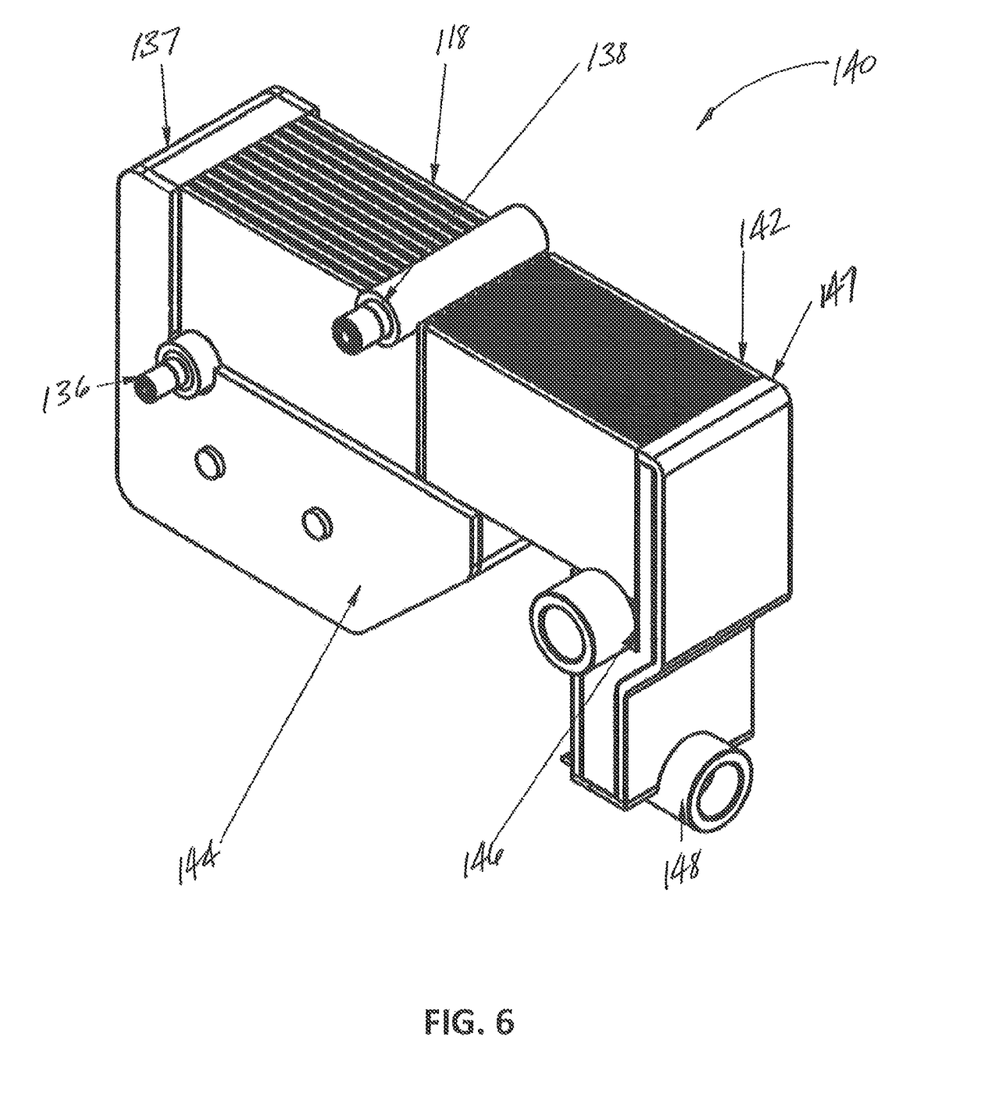
FIG. 6 shows a perspective view of an embodiment of an air dryer for an integrated air dryer according to the present disclosure.

As shown in FIG. 5, the refrigeration circuit 102 and the air dryer 104 may packaged as an air dryer subassembly 200 to facilitate integration with the air compressor subassembly 101 and incorporation into the integrated air dryer system 100. The air dryer subassembly 200 may include a base 172 upon which the refrigeration circuit 102 and the air dryer 104 are disposed. The base 172 may be configured to support the weight of the air dryer subassembly 200 and facilitate integration with the air compressor subassembly 101. The base 172 may be made of any suitable material, including but not limited to metal, such as steel. To reduce the space, and thus cost, required to package the air dryer subassembly 200 into the integrated air dryer system 100, the chiller 118, the precooling heat exchanger 142, and the second condensate separator 144 may be arranged in an interconnected exchanger subassembly 140 as shown in FIGS. 5 and 6. The exchanger subassembly 140 may include an inlet air connection fitting 146, an outlet air connection fitting 148, and a precooler manifold 147, each in fluid communication with the precooling heat exchanger 142 of the air dryer 104. The exchanger subassembly 140 may further include an inlet refrigerant connection fitting 136, an outlet refrigerant connection fitting 138, and a chiller manifold 137, each in fluid communication with the chiller 118 of the refrigeration circuit 102.

Referring to FIG. 2, the refrigeration circuit 102 may include a refrigerant dryer 120 disposed between the condenser 114 and the expander 116 and configured to remove contaminants, such as water, from the refrigerant. The refrigeration circuit 102 may further include a pressure relief valve 122 operatively coupled to a pressure relief line 123 and the refrigerant compressor 112, and a hot gas bypass valve 124 operatively coupled to a bypass line 125, though one or more of these components may be omitted in certain embodiments. The pressure relief valve 122 and the pressure relief line 123 may selectively fluidly couple a compression chamber of the refrigerant compressor 112 to the refrigerant loop 103 downstream of the condenser 114. The pressure relief valve 122 may prevent damage to the refrigerant compressor 112 and other components of the refrigeration circuit 102 due to over-pressurization by opening when the pressure of the refrigerant in the pressure relief line 123 reaches a threshold value. The hot gas bypass valve 124 may facilitate control of the pressure within the chiller 118 via a pressure equalization line 127 under partial flow operation at moderate and high ambient temperature conditions. Whether a given embodiment includes the hot gas bypass valve 124 may be determined by the selected thermal capacitance of the chiller 118 and the low and high temperature limits.

Figure 7:
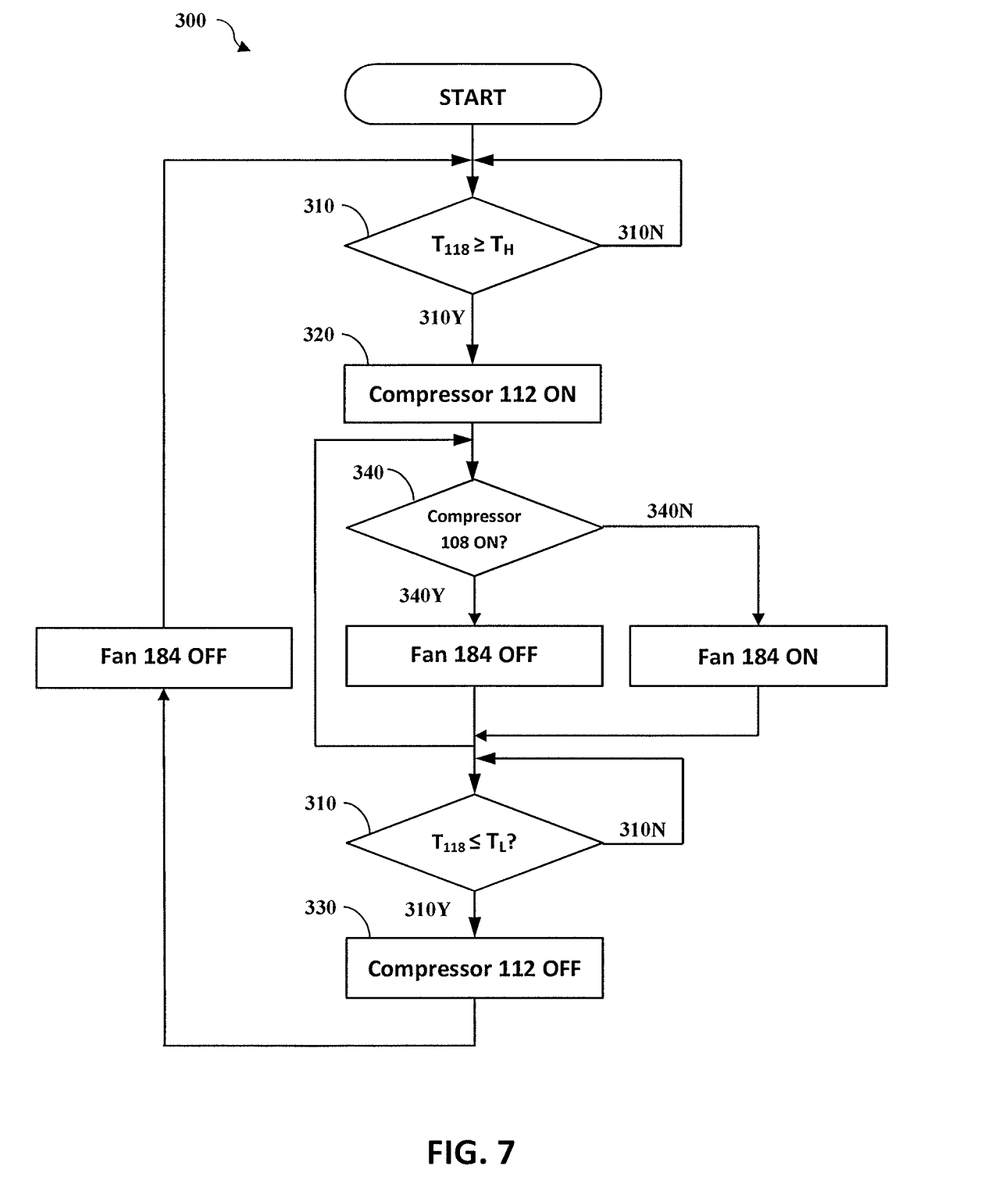
FIG. 7 illustrates a method of controlling an integrated air dryer according to the present disclosure.

In one aspect of the present disclosure, the integrated air dryer system 100 may be used in a method 300 to prevent both the formation of ice within the refrigeration circuit 102 and over-heating of the refrigerant compressor 112 as shown in FIG. 7. The method 300 may include a step 310 of monitoring a temperature of the chiller 118. The method 300 may include the step 320 of switching on the refrigerant compressor 112 when the temperature of the chiller 118 rises above the prescribed high temperature limit $T_H$. The method 300 may further include the step 330 of switching off the refrigerant compressor 112 when the temperature of the chiller 118 falls below the prescribed low temperature limit $T_L$. The method 300 may further include the step 340 of switching on the condenser fan 180 under conditions when the refrigerant compressor 112 is switched on and the air compressor 108 is switched off, whether due to sufficient pressure in the dryer air line 105 or otherwise. In at least one embodiment of the method 300, the steps 310, 320, 330, or 340 may be repeated as necessary to monitor and control the system 100 as described herein.

Figure 8:
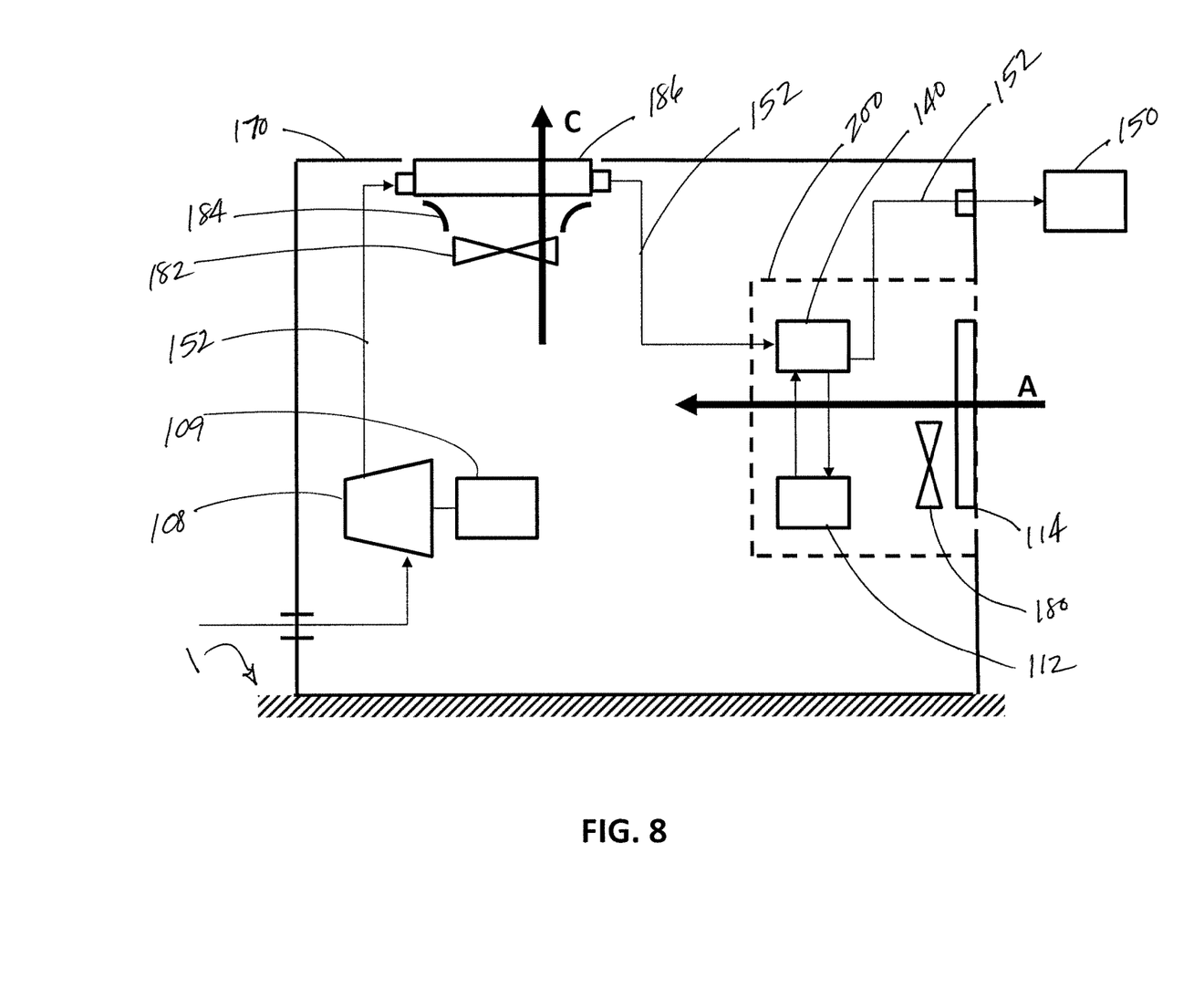
FIG. 8 shows a cross-sectional view of an embodiment of an integrated air dryer according to the present disclosure.

FIG. 8 shows an alternative embodiment of an integrated air dryer system 300. As shown in FIG. 8, the integrated air dryer system 300 may be position on a stable surface 1 and enclosed by the housing 170. The housing 170 includes openings, which may provide inlets and/or outlets, that enable the flow of ambient air into and out of the system 300. The integrated air dryer system 300 may include the air compressor 108, which is driven by a compressor motor 109, disposed near the stable surface 1 and near an opening disposed near the bottom of the housing 170 adjacent the air compressor 108 to enable a supply of air to be compressed by the air compressor 108. The integrated air dryer system 300 may include the air dryer subassembly 200, including the condenser 114, disposed at or near an opening through another side of the housing 170, thereby enabling the first flow path A into the housing 170 and through the air dryer subassembly 200. The integrated air dryer system 300 may further include cooling fan 182 positioned at or near the top of the housing 170 adjacent an opening that enables the third flow path C through the air cooler 186 and out of the housing 170. The system 300 may include a shroud 184 disposed between the cooling fan 182 and the air cooler 186 to funnel the third flow path C from the cooling fan 182 through the air cooler 186. The first flow path A and the third flow path C may be generated by the cooling fan 182 and/or the condenser fan 180 of the air dryer subassembly 200. As shown in FIG. 8, the system 300 may include a compressed air line 152 through which compressed air flows through the system 300. The compressed air line 152 connects an output of the air compressor 108 to the air cooler 186 to the exchanger subassembly 140 of the air dryer subassembly 200 to a point of use 150 outside of the housing 170 via an opening.

In operation, the air compressor subassembly 101 of the integrated air dryer system 100 may be intermittently activated as needed to provide the desired supply or flow of compressed air. Though packaged together within the housing 170 and thermally connected via the chiller 118, the refrigeration circuit 102 may operate independent of the air compressor subassembly 101. The controller 130 may monitor the temperature of the chiller 118, whereby the refrigeration circuit 102, and specifically the refrigerant compressor 112, may be activated to maintain the chiller 118 in a desired temperature range in anticipation of operation of the air compressor subassembly 101. The chiller 118 may include sufficient thermal mass such that the refrigerant compressor 112 need not be operated continuously or frequently in anticipation of operation of the air compressor 108. While a cooling air flow across the refrigeration circuit 102 can be created by operation of the air compressor subassembly 101, and specifically the cooling fan 182, when the air compressor subassembly 101 is not operated the condenser fan 180 can be used to provide cooling to the internal heat generating components of the refrigeration circuit 102, including the refrigerant compressor 112. Consequently, the condenser fan 180 may be sized to provide only enough cooling to dissipate such internal heat. Thus, some embodiments of the integrated air dryer 100 may include both the chiller 118 having sufficient thermal mass such that the refrigerant compressor 112 need not be operated continuously or frequently in anticipation of operation of the air compressor 108 and having the condenser fan 180, which can be used to provide cooling to the internal heat generating components of the refrigeration circuit 102 under conditions when the air compressor subassembly 101 is not operating.

As will be understood by one skilled in the art having the benefit of the present disclosure, the terms used to identify the components of the integrated air dryer systems disclosed herein may be similarly described by other terms unless explicitly provided to the contrary. For example, the integrated air dryer system 100 may be referred to as an air compressor unit, the air dryer subassembly 200 may be referred to as an integrated air dryer or, simply, a dryer, the housing 170 may be referred to as an air compressor unit enclosure, the air cooler 186 may be referred to as a compressor cooler. Such difference in terms does not alter the structure or operation of the integrated air dryer system.

While various embodiments of an integrated air dryer and methods for using the same have been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible and are therefore contemplated by the inventor. Therefore, the particular order of the steps disclosed herein should not be construed as limitations of the present disclosure. Such sequences may be varied and still remain within the scope of the present disclosure.

What is claimed is:

1. A dryer for removing moisture from a gas, the dryer comprising:
   a first fluid circuit in which the gas is conveyed, the first fluid circuit comprising a gas compressor structured to provide a compression to the gas, the first fluid circuit also including a gas heat transfer portion configured in fluid communication with a condensate separator;
   a second fluid circuit through which a refrigerant is circulated, the second fluid circuit comprising a refrigerant compressor, a condenser, and a refrigerant heat transfer portion adjacent to and in thermal communication with the gas heat transfer section,
   a first heat exchanger defining fluid pathways and including the gas heat transfer portion and the refrigerant heat transfer portion, the first heat exchanger also having a storage thermal capacitance defined by plates in thermal communication with the gas heat transfer portion and the refrigerant heat transfer portion, wherein the plates have sufficient mass for the storage thermal capacitance to enable heat transfer for a predetermined duration from the gas heat transfer portion to provide condensation of fluid from the first fluid circuit when the second fluid circuit is not operating; and
   a controller in communication with the first heat exchanger and structured to operate upon a change in a temperature of the first heat exchanger, wherein the controller is configured to activate and deactivate the refrigerant compressor depending on the temperature of the first heat exchanger relative to low and high temperature limits.

2. The dryer of claim 1, wherein the plates include metal and/or ceramic materials.

3. The dryer of claim 1, wherein the fluid pathways of the first heat exchanger, through which the gas and refrigerant flow through the first heat exchanger and exchange heat with one another, comprise walls having a wall thermal capacitance, which is defined as a wall thickness required for the structural integrity of the first heat exchanger, and
   wherein the storage thermal capacitance comprises a wall thickness of the fluid pathways that is greater than the wall thermal capacitance.

4. The dryer of claim 1, wherein the controller activates the refrigerant compressor when the temperature of the first heat exchanger exceeds the prescribed high temperature limit and deactivates the refrigerant compressor when the temperature of the first heat exchanger is below the prescribed low temperature limit.

5. The dryer of claim 1, wherein the controller comprises a thermostatic switch adapted to activate and deactivate the refrigerant compressor depending on the temperature relative to the prescribed low and high temperature limits.

6. The dryer of claim 1, wherein the first fluid circuit further comprises a second heat exchanger, the second heat exchanger including a precooling portion disposed upstream from gas heat transfer portion of the first heat exchanger and a reheating portion disposed downstream of the gas heat transfer portion, such that the precooling portion is adjacent to and in thermal communication with the reheating portion.

7. The dryer of claim 6, wherein the condensate separator is disposed between the gas heat transfer portion and the precooling portion of the first fluid circuit.

8. The dryer of claim 6, wherein the fluid pathways include a plurality gas flow paths through the gas heat transfer portion of the first heat exchanger, a plurality of precooling flow paths through the precooling portion of the second heat exchanger, a plurality of reheating flow paths through the reheating portion of the second heat exchanger, and a plurality of refrigerant flow paths through the refrigerant heat transfer portion of the first heat exchanger,
   wherein the gas flow paths are in thermal communication with the refrigerant flow paths, and the precooling flow paths are in thermal communication with the reheating flow paths.

9. The dryer of claim 1, the dryer further comprising a first cooling fan in fluid communication with the condenser of the second fluid circuit, the first cooling fan having a flow capacity approximately sufficient to dissipate heat generated by the refrigerant compressor but not sufficient to dissipate heat transferred from the first fluid circuit via the first heat exchanger, wherein the first cooling fan operates when the first fluid circuit is not operating.

10. The dryer of claim 1, the dryer further comprising a second heat exchanger, in fluid communication with the gas compressor, and a second cooling fan structured to generate flow across the second heat exchanger and at least a portion of the second fluid circuit.

11. An apparatus for removing moisture from a gas, the apparatus comprising:
    a first fluid circuit in which the gas is conveyed, the first fluid circuit including a gas compressor, a first cooling fan fluid communication with a first heat exchanger and a condenser, the first fluid circuit having a gas heat transfer portion in communication with the first heat exchanger and oriented in fluid communication with a condensate separator, wherein operation of the first fluid circuit generates an air intake flow;
    a second fluid circuit through which a refrigerant is circulated, the second fluid circuit having a refrigerant compressor, the condenser, and a refrigerant heat transfer portion in communication with the first heat exchanger and adjacent to and in thermal communication with the gas heat transfer section, such that heat is transferred between the gas heat transfer portion and the refrigerant heat transfer portion, wherein when the first fluid circuit is operating the intake air flow cools at least a portion of the second fluid circuit;
    a second cooling fan in fluid communication with the condenser, the second cooling fan having a flow capacity approximately sufficient to dissipate heat generated by the refrigerant compressor and maintain a temperature of the refrigerant compressor below a safety limit during periods in which the second fluid circuit is operating but the first fluid circuit is not operating to provide the air intake flow; and
    wherein the first heat exchanger comprises fluid pathways defined by one or more walls having a mass with a defined storage thermal capacitance, through which the gas and refrigerant exchange heat with one another, wherein the storage thermal capacitance of the one or more walls enables heat transfer from the gas when the second fluid circuit is not operating.

12. The apparatus of claim 11, wherein the first cooling fan is further in fluid communication with the refrigerant compressor.

13. The apparatus of claim 11, the dryer further comprising a controller in communication with the first heat exchanger and structured to operate upon a change in a temperature of the first heat exchanger, wherein the controller is configured to activate and deactivate the refrigerant compressor depending on the temperature of the first heat exchanger relative to prescribed low and high temperature limits.

14. The apparatus of claim 13, wherein the controller comprises a thermostatic switch adapted to activate and deactivate the refrigerant compressor depending on the temperature relative to the prescribed low and high temperature limits.

15. The apparatus of claim 11, wherein the storage thermal capacitance comprises metal plates disposed adjacent the fluid pathways.

16. The apparatus of claim 11, wherein the storage thermal capacitance comprises a wall thickness of the fluid pathways that is greater than required for the structural integrity of the first heat exchanger, which comprises the wall thermal capacitance.

17. The apparatus of claim 11, the dryer further comprising a second heat exchanger, in fluid communication with the gas compressor, and a second cooling fan structured to generate flow across the second heat exchanger and at least a portion of the second fluid circuit.

18. A method for drying a gas, the method comprising:
flowing a gas to be dried through a first fluid circuit, the first fluid circuit comprising a gas compressor and a first heat exchanger having a gas heat transfer portion in fluid communication with a condensate separator;
circulating a refrigerant through a second fluid circuit, the second fluid circuit comprising a refrigerant compressor, a condenser, and a refrigerant heat transfer portion disposed within the first heat exchanger and adjacent to and in thermal communication with the gas heat transfer section;
separating moisture from the gas in the condensate separator after the gas has flowed through the gas heat transfer portion;
monitoring a temperature of the first heat exchanger;
activating the refrigerant compressor when the temperature of the first heat exchanger exceeds a high temperature limit;
deactivating the refrigerant compressor when the temperature of the first heat exchanger is below a low temperature limit;
cooling the gas in the first heat exchanger and cooling the refrigerant in the condenser with a first cooling fan when the first fluid circuit is operating;
selectively cooling the refrigerant in the condenser with a second cooling fan;
activating the second cooling fan when the first fluid circuit is not operating, the second cooling fan in fluid communication with the condenser of the second fluid circuit, and the second cooling fan having a flow capacity approximately sufficient to dissipate heat generated by the refrigerant compressor and maintain a temperature of the refrigerant compressor below a safety limit during periods in which the second fluid circuit is operating but the first fluid circuit is not operating; and
cooling the gas in the first heat exchanger with a plate having a defined mass sufficient for receiving heat transfer from the gas flowing through the first circuit for a predetermined amount of time after the second circuit is shut off.

19. The method of claim 18, wherein the step of monitoring the temperature of the first heat exchanger is performed by a controller in communication with the first heat exchanger and structured to operate upon a change in the temperature of the first heat exchanger, wherein the controller is configured to activate and deactivate the refrigerant compressor depending on the temperature relative to the prescribed low and high temperature limits.

20. The method of claim 18, wherein the step of monitoring the temperature of the first heat exchanger is performed by a thermostatic switch adapted to respond between the prescribed low and high temperature limits.

21. The method of claim 18, wherein the second cooling fan is in fluid communication with the refrigerant compressor of the second fluid circuit, the second cooling fan is activated when the refrigerant compressor is activated but no gas is flowing through the first fluid circuit, wherein the second cooling fan has a flow capacity approximately sufficient to dissipate heat generated by the refrigerant compressor but not sufficient to dissipate heat transferred from the first fluid circuit.

22. The method of claim 18, wherein the first fluid circuit further comprises a second heat exchanger, the second heat exchanger including a precooling portion disposed upstream from gas heat transfer portion of the first heat exchanger and a reheating portion disposed downstream of the gas heat transfer portion, such that the precooling portion is adjacent to and in thermal communication with the reheating portion.

23. The method of claim 22, wherein the condensate separator is disposed between the gas heat transfer portion and the precooling portion of the first fluid circuit.

24. The method of claim 18, wherein the first heat exchanger comprises fluid pathways, defined by walls having a wall thermal capacitance, through which the gas and refrigerant flow through the first heat exchanger and exchange heat with one another, and further comprising a storage thermal capacitance in thermal communication with the gas heat transfer portion.

25. The method of claim 24, wherein the storage thermal capacitance comprises metal plates disposed adjacent the fluid pathways.

26. The method of claim 24, wherein the storage thermal capacitance comprises a wall thickness of the fluid pathways that is greater than required for the structural integrity of the first heat exchanger, which comprises the wall thermal capacitance.

27. The method of claim 18, the method further comprising draining condensate that accumulates in the condensate separator.

28. The method of claim 18, wherein the activating of the first cooling fan occurs under a condition that corresponds to the first fluid circuit being inactive.

29. The method of claim 18, wherein the first fluid circuit further comprises a second heat exchanger, in fluid communication with the gas compressor, and the first cooling fan structured to generate flow across the second heat exchanger and at least a portion of the second fluid circuit.

* * * * *